United States Patent
Kazirskis

[19]

[11] Patent Number: 6,132,147
[45] Date of Patent: Oct. 17, 2000

[54] APPARATUS AND METHODS FOR DRILLING WITH CAPTURE OF ALL PROCESS DEBRIS

[75] Inventor: Benedict Kazirskis, Coonrapids, Minn.

[73] Assignee: General Electric Company, Schenectady, N.Y.

[21] Appl. No.: 09/222,525

[22] Filed: Dec. 29, 1998

[51] Int. Cl.[7] .................... B23B 47/18; B23C 9/00
[52] U.S. Cl. .................... 408/1 R; 408/67; 409/137
[58] Field of Search .................... 376/310, 313, 376/316, 260; 408/1 R, 56, 67, 80, 95; 409/137; 29/DIG. 86, DIG. 26

[56] References Cited

U.S. PATENT DOCUMENTS

| | | | |
|---|---|---|---|
| 2,906,256 | 9/1959 | Glynn | 408/67 |
| 3,661,204 | 5/1972 | Blanding et al. | 166/0.5 |
| 4,077,671 | 3/1978 | Bunnelle | 299/17 |
| 4,209,069 | 6/1980 | Smith | 408/67 X |
| 4,240,173 | 12/1980 | Sherill | 15/1.7 |
| 4,403,892 | 9/1983 | Kane | 408/95 |
| 4,450,857 | 5/1984 | Baugh et al. | 137/318 |
| 4,649,609 | 3/1987 | Allison et al. | 29/26 A |
| 4,690,593 | 9/1987 | Nee et al. | 408/80 |
| 4,835,355 | 5/1989 | Niinivaara et al. | 219/72 |
| 4,862,568 | 9/1989 | Wankmuller et al. | 29/26 B |
| 5,016,717 | 5/1991 | Simons et al. | 175/66 |
| 5,028,218 | 7/1991 | Jensen et al. | 417/423.3 |
| 5,356,245 | 10/1994 | Hosoi et al. | 408/56 |
| 5,535,836 | 7/1996 | Cagianut et al. | 175/213 |
| 5,687,205 | 11/1997 | Matsumoto et al. | 376/260 |
| 5,737,377 | 4/1998 | Stefko et al. | 376/268 |

FOREIGN PATENT DOCUMENTS 2383740  11/1978  France .................... 408/67

Primary Examiner—William Briggs
Attorney, Agent, or Firm—Armstrong Teasdale LLP

[57] ABSTRACT

An underwater machining apparatus that is capable of drilling completely through a surface and collecting all machining debris is described. The underwater machining apparatus, in one embodiment, includes a drill body, a drill motor coupled to the drill body, a drill bit coupled to the drill motor, and a drill bit sleeve positioned coaxially around the drill bit. The underwater machining apparatus also includes a vacuum assembly coupled to and in fluid communication to the drill bit sleeve. The drill bit sleeve is configured so as to permit water to be drawn through the sleeve by the vacuum assembly, thereby removing the machining debris. The vacuum assembly includes a collection container configured to collect solid particles of machining debris while permitting water to flow through the container.

19 Claims, 1 Drawing Sheet

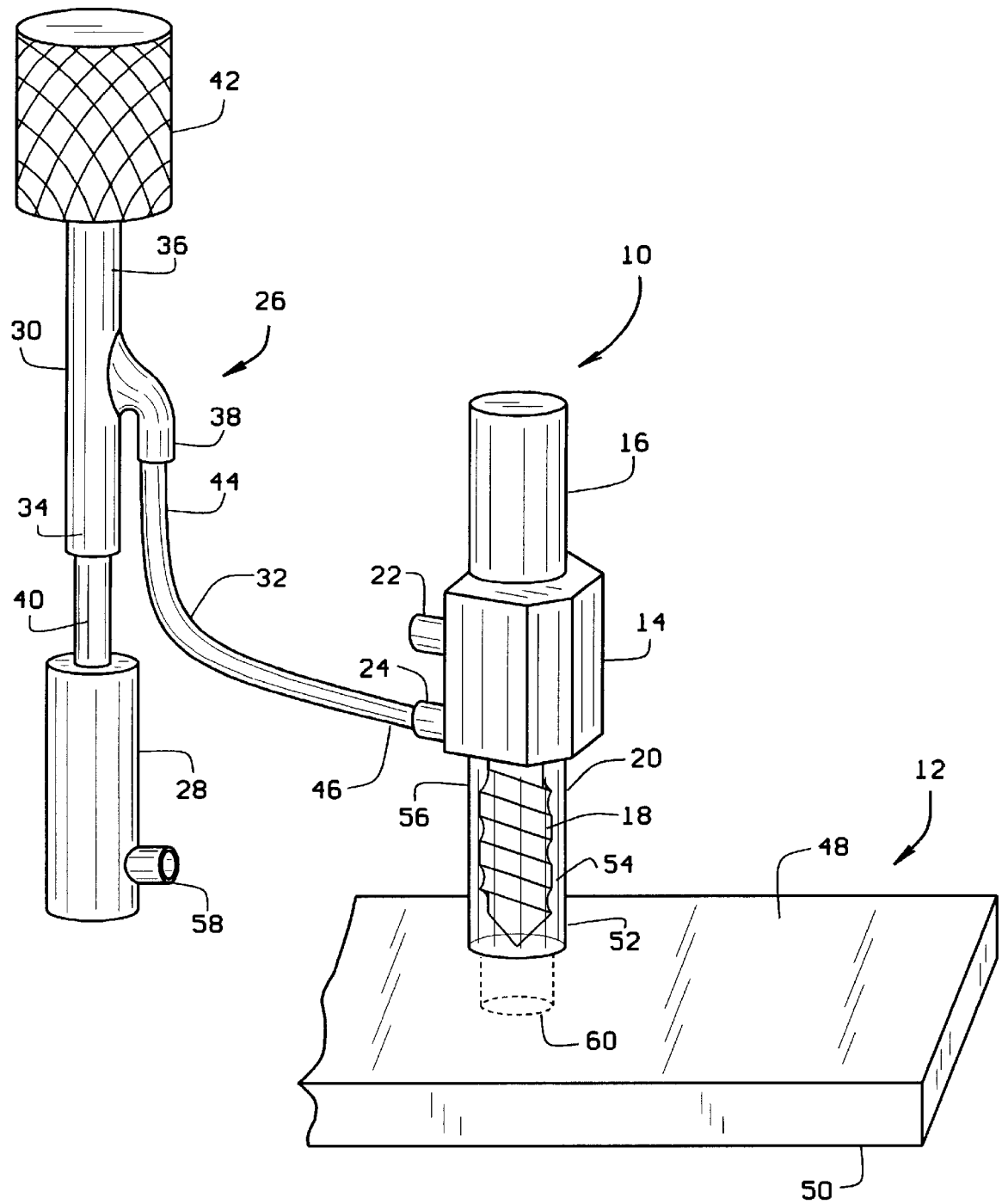

APPARATUS AND METHODS FOR DRILLING WITH CAPTURE OF ALL PROCESS DEBRIS

BACKGROUND OF THE INVENTION

This invention relates generally to drilling, and more particularly, to drilling completely through an object underwater and capturing all process debris using high flow suction.

Nuclear reactor repairs and modifications often require machining operations such as drilling and milling within the reactor vessel and typically underwater. All machining debris should be retained in such machining operations and not allowed to infiltrate and contaminate the reactor. Known underwater drilling tool systems and methods address the basic requirement that the machining debris be retained.

One such method utilizes a high pressure direct water flow induced integral with the mechanics of the machining system to create a hydroplaning effect at the tool bit face. The high pressure water flow facilitates chip breakage from the surface and serves as the flowing medium to carry the chips to an integral chip containment receptacle. To completely assure that no debris escaped the cut, a secondary machining operation, such as electric discharge machining (EDM), is necessary to machine the final ligament on the back side of the cut. The method does not permit the tool bit to completely cut through the material. Rather, the EDM process, which does not produce machining debris, is used to complete the cut through the material. However, the EDM process is extremely slow.

It would be desirable to provide apparatus and methods to cut completely through an object underwater in a nuclear reactor and collect all machining debris without employing secondary machining operations, such as EDM.

BRIEF SUMMARY OF THE INVENTION

These and other objects may be attained by an underwater machining apparatus that is capable of drilling completely through a surface and collecting all machining debris. The underwater machining apparatus, in one embodiment, includes a drill body, a drill motor coupled to the drill body, a drill bit coupled to the drill motor, and a drill bit sleeve positioned coaxially around the drill bit. The underwater machining apparatus also includes a vacuum assembly coupled to and in fluid communication with the drill bit sleeve. The drill bit sleeve is configured so as to permit water to be drawn through the sleeve by the vacuum assembly, thereby removing the machining debris.

In one embodiment, the vacuum assembly includes a pump, an eductor coupled to an outlet of the pump, and a suction line coupled at one end to the drill bit sleeve and at a second end to the suction inlet of the eductor. The vacuum assembly also includes a collection container coupled to an outlet of the eductor. The collection container is configured to collect solid particles of machining debris while permitting water to flow through the container.

In operation, the underwater machining apparatus is positioned adjacent the surface to be machined, typically under water within a nuclear reactor vessel. Particularly, the drill bit and drill bit sleeve are positioned adjacent the work surface to be drilled. The sleeve seals at one end with the work surface to form a chamber around the drill bit. The chamber is open at the other end of the sleeve to permit water to be drawn through the chamber by the vacuum pump. The suction line from the eductor vacuum pump is coupled to the drill bit sleeve to draw water through the drill bit sleeve.

The drill motor turns the drill bit, and the suction pump draws water through the sleeve and around the drill bit. The flowing water captures the debris produced by the drilling action of the drill bit and directs the debris through the suction line to the collection chamber. The collection chamber permits the water to flow through the chamber, but is configured to collect the solid debris material.

The above described underwater machining apparatus can drill completely through an object underwater in a nuclear reactor and collect the machining debris. The collection of the machining debris prevents the debris from infiltrating and contaminating the reactor.

BRIEF DESCRIPTION OF THE DRAWING

The FIGURE is a schematic illustration of an underwater machining apparatus in accordance with an embodiment of the present invention.

DETAILED DESCRIPTION OF THE INVENTION

The FIGURE is a schematic illustration of an underwater machining apparatus 10 that is capable of drilling completely through an object 12 and collecting the machining debris. Underwater machining apparatus 10, in one embodiment includes a drill body 14, a drill motor 16 coupled to drill body 14, a drill bit 18 coupled to drill motor 16, and a drill bit sleeve 20 positioned coaxially around drill bit 18. Drill body 14 includes an inlet port 22 and an outlet port 24 in fluid communications with drill bit sleeve 20.

Underwater machining apparatus 10 also includes a vacuum assembly 26 in fluid communication with drill bit sleeve 20. Particularly, in one embodiment, vacuum assembly 26 includes a pump 28, an eductor 30, and a suction line 32. Eductor 30 includes an inlet 34, an outlet 36, and a suction inlet 38. Eductor inlet 34 is coupled to an outlet 40 of pump 28. Eductor outlet 36 is coupled to a collection container 42. Eductor suction inlet 38 is coupled to a first end 44 of suction line 34. A second end 46 of suction line 34 is coupled to outlet port 24 of drill body 14. Collection container 42 is configured to collect the solid particles of machining debris while permitting water to flow through container 42.

Pump 28 may be a submersible type pump capable of operating underwater. However, pump 28 may be any pump that is capable of pumping water from an inlet line submerged underwater and through an outlet line that terminates under water. Also, drill motor 16 may be any type of drill motor capable of operating underwater. Drill motor 16 may be a sealed electric motor, a pneumatic motor or a hydraulic type motor. Additionally, drill bit 18 may be a fluted type drill bit, a trepan type drill bit, a hollow core type drill bit, or a spade type drill bit.

Object 12 includes a first surface 48 and a second surface 50. To drill through object 12, underwater machining apparatus 10 is positioned adjacent first surface 48. Typically object 12 is located underwater inside a nuclear reactor vessel (not show). Particularly, drill bit 18 and drill bit sleeve 20 are positioned adjacent object 12. Sleeve 20 seals at a first end 52 with first surface 48 to form a chamber 54 around drill bit 18. A second end 56 of sleeve 20 is coupled to drill body 14. Chamber 54 is in flow communication with inlet port 22 and outlet port 24 to permit water to be drawn through chamber 54 by vacuum assembly 26. Particularly, eductor suction line 32 is coupled to drill body 14 at inlet port 24 to draw water through drill bit sleeve 20 and around drill bit 18.

As drill motor 16 turns drill bit 18, suction assembly 26 draws water through sleeve 20. Particularly, pump 28 pumps water from a pump inlet 58, out pump outlet 40, through eductor 30, and through collection container 42. As water flows past eductor suction inlet 38, a vacuum is formed in suction line 32. The vacuum in suction line 32 causes water to flow from inlet port 22 through drill sleeve 20 and out through outlet port 24. This flow of water flows through suction line 32 through eductor 30 and into collection container 42. The flowing water captures the debris produced by the drilling action of drill bit 18 and directs the debris through suction line 32 to collection container 42. Collection container 42 permits the water to flow through but is configured to collect the solid debris material.

When drill bit 18 pierces through second surface 50 of object 12, an additional water inlet 60 is formed that is in flow communication with chamber 54 and suction line 32. Because water flows into sleeve 209 through inlet 60 and out suction line 32, any debris created as drill bit 18 pierces through second surface 50 is captured in the flow of water and directed to collection container 42.

The above described underwater machining apparatus 10 can drill completely through an object 12 underwater in a nuclear reactor and collect the machining debris. The collection of the machining debris prevents the debris from infiltrating and contaminating the reactor.

In an alternative embodiment, vacuum assembly 26 may be an underwater vacuum device having an integral collection chamber. An example of an underwater vacuum is the Tri-Nuke Vacuum commercially available from Tri Nuclear Corporation, Ballston Lake, N.Y.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An underwater machining apparatus for drilling through an object, the object having a top surface, said apparatus comprising:

a drill body comprising a water inlet port and a water outlet port;

a drill bit coupled to a drill motor, said drill motor coupled to said drill body;

a drill bit sleeve positioned coaxially around said drill bit, said drill bit sleeve configured to engage the top surface of the object to form an enclosed chamber around the drill bit; and a vacuum assembly coupled to said water outlet port, and in flow communication with said drill bit sleeve, said vacuum assembly configured to cause water to flow from said water inlet port through said drill bit sleeve and out through said water outlet port.

2. An underwater drill apparatus for drilling through an object underwater, the object having a top surface, said apparatus comprising:

a drill motor;

a drill bit coupled to said drill motor;

a drill bit sleeve positioned coaxially around said drill bit, said drill bit sleeve configured to engage the top surface of the object to form an enclosed chamber around the drill bit;

a water inlet port in flow communication with said drill bit sleeve;

a water outlet port in flow communication with said drill bit sleeve; and a vacuum assembly coupled to and in flow communication with said drill bit sleeve, said vacuum assembly configured to cause water to flow from said water inlet port through said drill bit sleeve and out through said water outlet port.

3. An underwater machining apparatus in accordance with claim 1 wherein said drill bit sleeve is coupled to said drill body and said vacuum assembly is coupled to said drill bit sleeve through said outlet port of said drill body.

4. An underwater machining apparatus in accordance with claim 3 wherein said vacuum assembly comprises:

a pump;

an eductor coupled to an outlet of said pump; and a suction line coupled at one end to said outlet of said drill body, and at a second end to a suction inlet of said eductor.

5. An underwater machining apparatus in accordance with claim 4 wherein said vacuum assembly further comprises a collection container coupled to an outlet of said eductor, said collection container configured to collect solid particles.

6. An underwater machining apparatus in accordance with claim 3 wherein said vacuum assembly comprises an underwater vacuum.

7. An underwater machining apparatus in accordance with claim 6 wherein said underwater vacuum comprises an integral collection container configured to collect solid particles.

8. An underwater machining apparatus in accordance with claim 1 wherein said drill bit is a fluted type drill bit, a hollow core type drill bit, a trepan type drill bit, or a spade type drill bit.

9. An underwater machining apparatus in accordance with claim 1 wherein said drill bit is a fluted type drill bit.

10. A method of drilling through an object underwater utilizing an underwater machining apparatus, the apparatus comprising a drill body comprising a water inlet port and a water outlet port, a drill motor coupled to the drill body, a drill bit coupled to the drill motor, a drill bit sleeve positioned coaxially around the drill bit, and a vacuum assembly coupled to the drill bit sleeve, the vacuum assembly including a collection chamber, said method comprising the steps of:

positioning the machining apparatus adjacent the object in a pool of water with the drill bit sleeve engaging a top surface of the object to form an enclosed chamber around the drill bit;

imparting a vacuum on the drill bit sleeve to cause water to flow from the water inlet port through the drill bit sleeve and out through the water outlet port;

drilling into the object; and collecting debris from the drilling action of the drill bit.

11. A method in accordance with claim 10 wherein positioning the machining apparatus adjacent the object comprises the steps of:

positioning the drill bit adjacent a first surface of the object; and positioning the drill bit sleeve adjacent the first surface of the object to form a chamber coaxially around the drill bit.

12. A method in accordance with claim 11 wherein the vacuum assembly comprises a pump, an eductor coupled to an outlet of the pump, and a suction line coupled at one end to the drill bit sleeve, and at a second end to a suction inlet of the eductor, and imparting a vacuum on the drill bit sleeve to cause water to flow through the drill bit sleeve comprises the step of pumping water through the eductor which creates a vacuum in the suction line.

13. An underwater drill apparatus in accordance with claim 2 wherein said drill bit is a fluted type drill bit.

14. An underwater drill apparatus in accordance with claim 2 further comprising a drill body comprising a water inlet port and a water outlet port, wherein said drill motor is coupled to said drill body.

15. An underwater drill apparatus in accordance with claim 14 wherein said drill bit sleeve is coupled to said drill body and said vacuum assembly is coupled to said drill bit sleeve through said outlet port of said drill housing.

16. An underwater drill apparatus in accordance with claim 15 wherein said vacuum assembly comprises:

a pump;

an eductor coupled to an outlet of said pump; and a suction line coupled at one end to said outlet of said drill housing, and at a second end to a suction inlet of said eductor.

17. An underwater drill apparatus in accordance with claim 16 wherein said vacuum assembly further comprises a collection container coupled to an outlet of said eductor, said collection container configured to collect solid particles.

18. An underwater drill apparatus in accordance with claim 2 wherein said vacuum assembly comprises an underwater vacuum, said underwater vacuum comprising an integral collection container configured to collect solid particles.

19. An underwater drill apparatus in accordance with claim 2 wherein said drill bit is a fluted type drill bit, a hollow core type drill bit, a trepan type drill bit, or a spade type drill bit.

* * * * *